(12) United States Patent
Dyar et al.

(10) Patent No.: US 11,198,468 B2
(45) Date of Patent: Dec. 14, 2021

(54) MOTORCYCLE POWER STEERING

(71) Applicants: Royce Merrell Dyar, Guntersville, AL (US); Dawn Renee Dyar, Guntersville, AL (US)

(72) Inventors: Royce Merrell Dyar, Guntersville, AL (US); Dawn Renee Dyar, Guntersville, AL (US)

( * ) Notice: Subject to any disclaimer, the term of this patent is extended or adjusted under 35 U.S.C. 154(b) by 174 days.

(21) Appl. No.: 16/720,837

(22) Filed: Dec. 19, 2019

(65) Prior Publication Data

US 2020/0207409 A1 Jul. 2, 2020

Related U.S. Application Data

(60) Provisional application No. 62/784,987, filed on Dec. 26, 2018.

(51) Int. Cl.
| | | |
|---|---|---|
| *B62D 5/12* | (2006.01) | |
| *B62D 5/09* | (2006.01) | |
| *B62K 23/02* | (2006.01) | |
| *B62D 5/06* | (2006.01) | |
| *B62K 21/00* | (2006.01) | |
| *B62J 43/30* | (2020.01) | |
| *B62K 21/12* | (2006.01) | |
| *B62K 21/02* | (2006.01) | |
| *B62J 43/00* | (2020.01) | |

(52) U.S. Cl.
CPC ............. *B62D 5/12* (2013.01); *B62D 5/06* (2013.01); *B62D 5/064* (2013.01); *B62D 5/09* (2013.01); *B62J 43/30* (2020.02); *B62K 21/00* (2013.01); *B62K 21/02* (2013.01); *B62K 21/12* (2013.01); *B62K 23/02* (2013.01); *B62J 43/00* (2020.02)

(58) Field of Classification Search
CPC . B62D 5/06; B62D 5/064; B62D 5/09; B62D 5/12; B62K 21/00; B62K 23/02; B62J 43/30
USPC ........................................................ 180/441
See application file for complete search history.

(56) References Cited

FOREIGN PATENT DOCUMENTS

| DE | 102017210456 A1 | * | 12/2018 | ............. B62K 21/00 |
| WO | WO-2011032544 A2 | * | 3/2011 | ............. B62K 21/00 |

* cited by examiner

*Primary Examiner* — Kevin Hurley
*Assistant Examiner* — Hosam Shabara
(74) *Attorney, Agent, or Firm* — Dunlap Bennett & Ludwig, PLLC; Brendan E. Squire

(57) ABSTRACT

A power steering system for a motorcycle, such as a motorcycle trike. The power steering system includes a piston having a piston rod disposed within a cylinder. A distal end of the piston rod is pivotably coupled to a fork tube of a motorcycle fork. A power source drives the piston rod away from the cylinder and retracts the piston rod within the cylinder. A control switch controls the piston between a neutral position, a first turn position, and a second turn position. The neutral position includes the piston rod partially extended from the cylinder. The first turn position includes the piston rod extending further from the cylinder than the neutral position. The second turn position includes the piston rod retracted further within the cylinder than the neutral position.

10 Claims, 3 Drawing Sheets

MOTORCYCLE POWER STEERING

CROSS-REFERENCE TO RELATED APPLICATION

This application claims the benefit of priority of U.S. provisional application No. 62/784,987, filed Dec. 26, 2018, the contents of which are herein incorporated by reference.

BACKGROUND OF THE INVENTION

The present invention relates to power steering and, more particularly, to power steering for motorcycles and motorcycle trikes.

A motorized tricycle, motor trike, or three-wheeled motorcycle is a three or four wheeled vehicle based on the same technology as a bicycle or motorcycle and powered by an electric motor or internal combustion engine. Currently, motorcycle trikes are difficult to steer.

As can be seen, there is a need for power steering for motorcycles and motorcycle trikes.

SUMMARY OF THE INVENTION

In one aspect of the present invention, a power steering system comprises: a piston comprising a piston rod disposed within a cylinder, wherein a distal end of the piston rod is configured to be pivotably coupled to a fork tube of a motorcycle fork; a power source configured to drive the piston rod away from the cylinder and retract the piston rod within the cylinder; and a control switch configured to control the piston between a neutral position, a first turn position, and a second turn position, wherein the neutral position comprises the piston rod partially extended from the cylinder, the first turn position comprises the piston rod extending further from the cylinder than the neutral position, and a second turn position comprises the piston rod retracted further within the cylinder than the neutral position.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
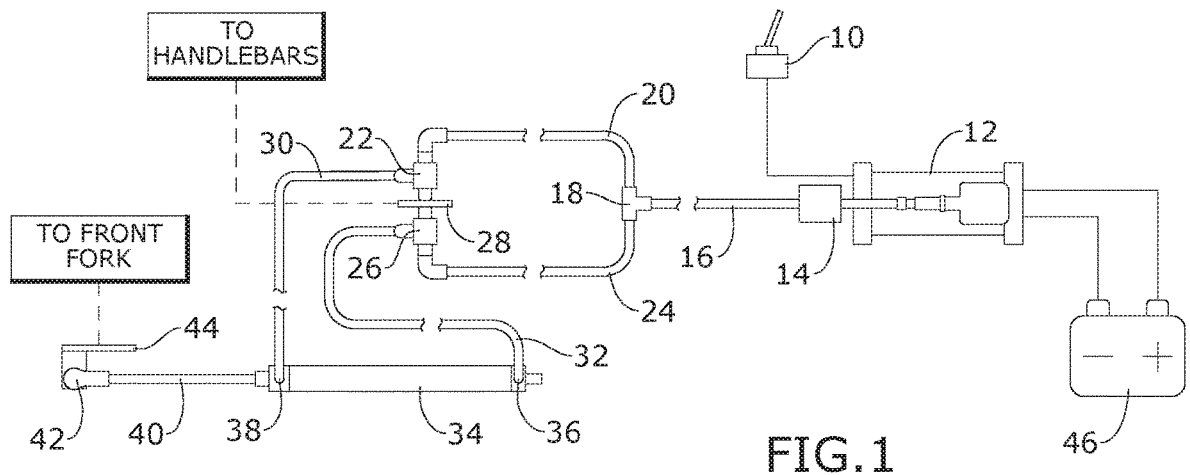
FIG. 1 is a schematic view of components of an embodiment of the present invention.
Figure 2:
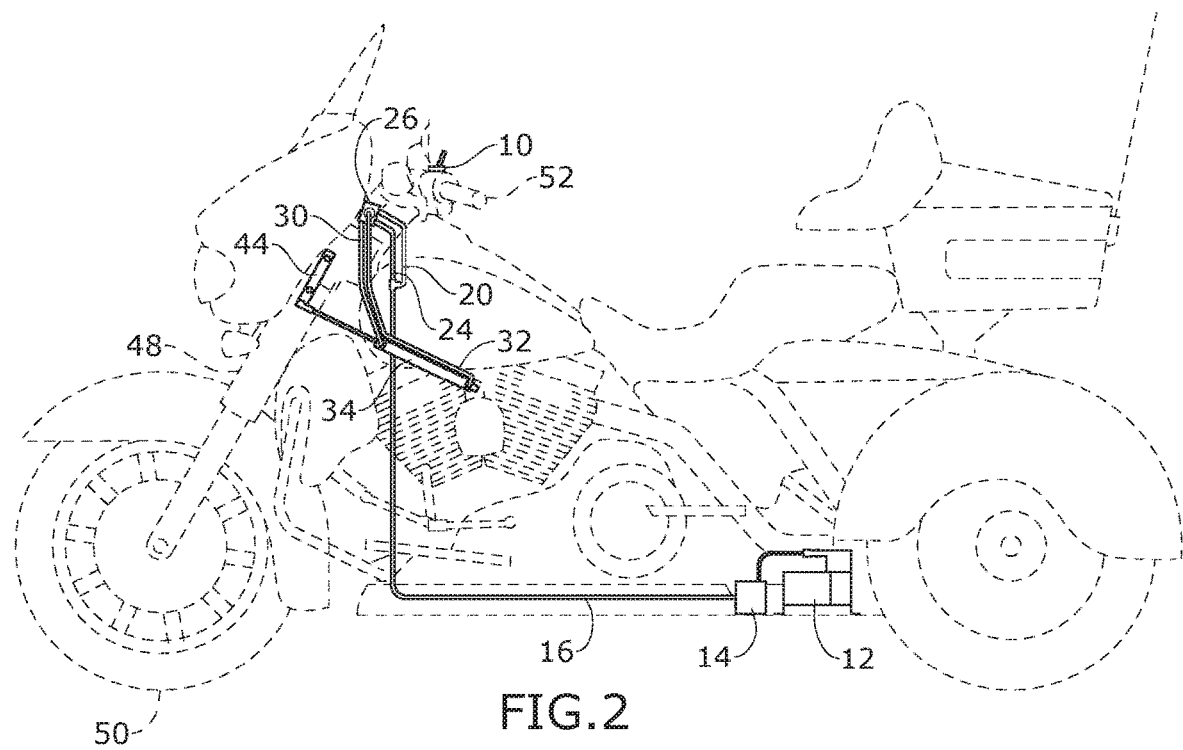
FIG. 2 is a schematic view of an embodiment of the present invention, illustrating exemplary arrangement of components on a motorcycle.
Figure 3:
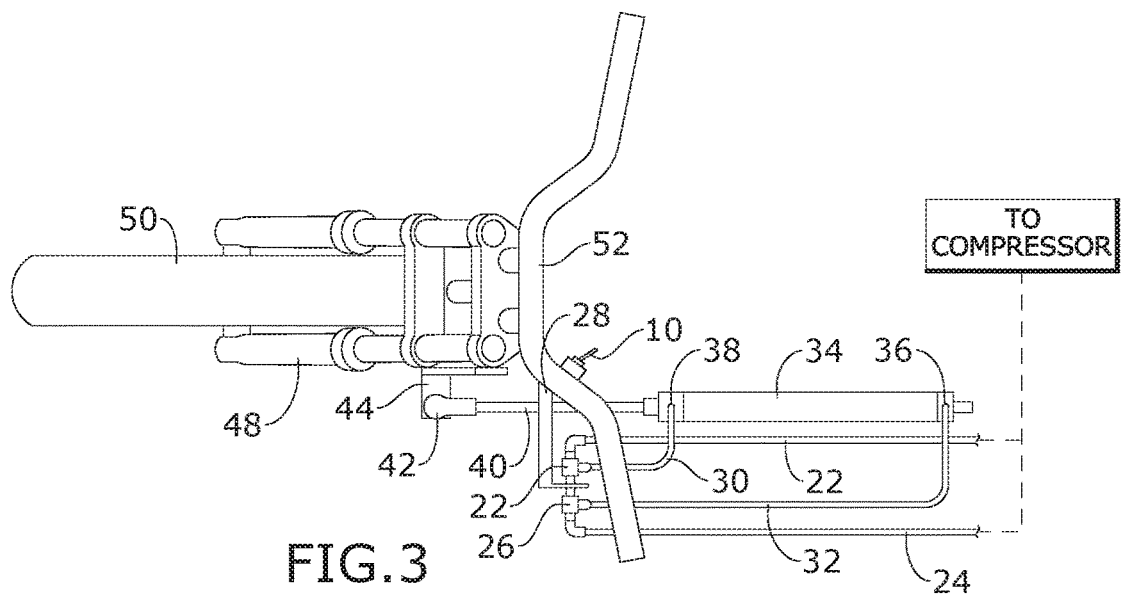
FIG. 3 is a top schematic view of an embodiment of the present invention, illustrating exemplary arrangement of components on a motorcycle.
Figure 4:
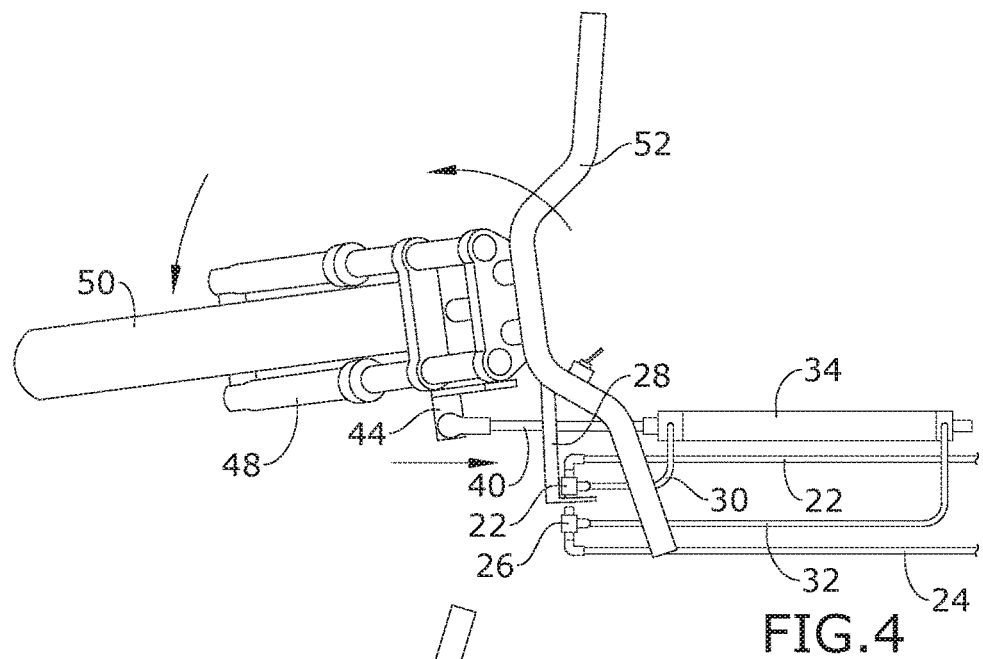
FIG. 4 is a schematic view of an embodiment of the present invention, illustrating the retracting of piston rod when push valve is depressing, aiding in turn the motorcycle to the left.
Figure 5:
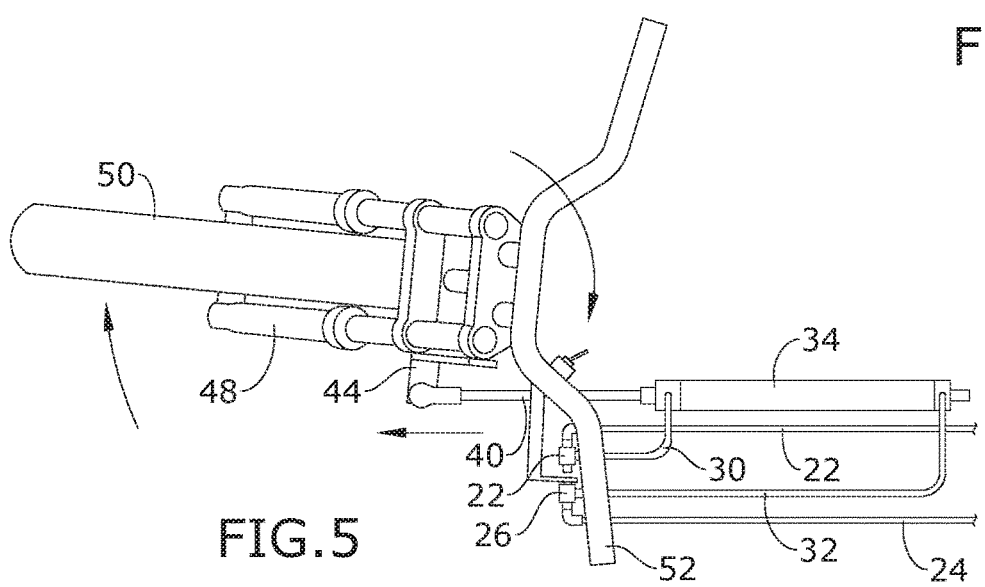
FIG. 5 is a schematic view of an embodiment of the present invention, illustrating the extension of piston rod when push valve is depressing, aiding in turn the motorcycle to the left.
Figure 6:
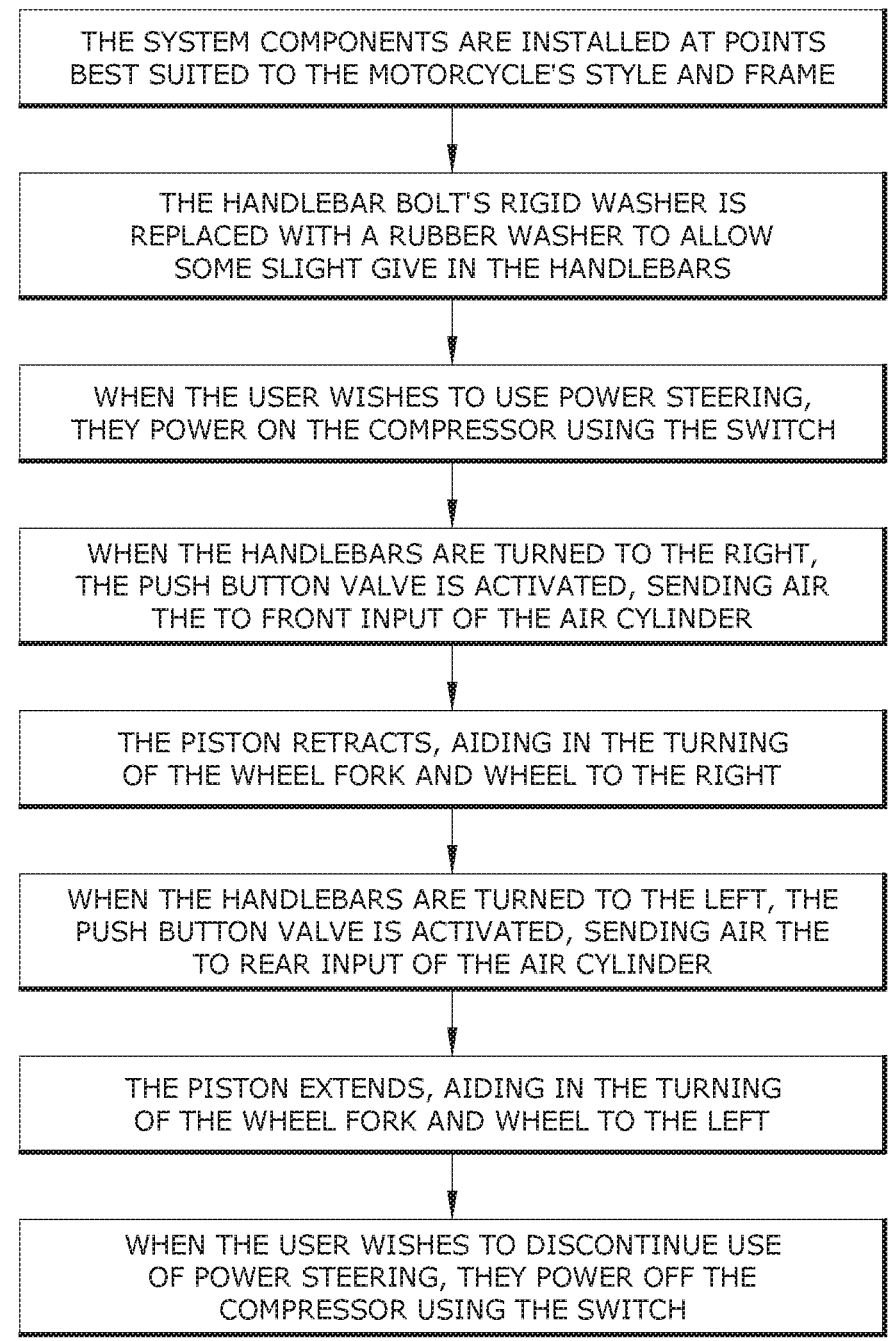
FIG. 6 is a flow chart of a method of installation of an embodiment of the present invention.

Referring to FIGS. 1 through 6, the present invention includes a power steering system for a motorcycle, such as a motorcycle trike. The power steering system includes a piston 34, 40 having a piston rod 40 disposed within a cylinder 34. A distal end of the piston rod 40 is pivotably coupled to a fork tube of a motorcycle fork 48. A power source 12, 46 drives the piston rod 40 away from the cylinder 34 and retracts the piston rod 40 within the cylinder 34. A control switch 22, 26 controls the piston between a neutral position, a first turn position, and a second turn position. The neutral position includes the piston rod 40 partially extended from the cylinder 34. The first turn position includes the piston rod 40 extending further from the cylinder 34 than the neutral position. The second turn position includes the piston rod 40 retracted further within the cylinder 34 than the neutral position.

The power source 12, 46 may includes a motorcycle battery 46 electrically connected with an air compressor 12. Hosing 15 runs from the air compressor 12 to the piston 34, 40. An air pressure switch 14 may be connected to the hosing 15 to regulate pressure. A power switch 10 may be coupled to the handlebar 52 of the motorcycle 50 and is used to switch power from the motorcycle battery 46 to the air pressure switch 14 and the air compressor 12, thereby turning the power steering system on and off.

The power steering system of the present invention may include manual controls or automatic controls. Manual controls allow a user to manually activate the control switch 22, 26 to extend or retract the piston rod 40 by pushing buttons or pressing pedals. Automatic controls extend or retract the piston rod 40 based on which direction the user turns the handlebars 52. For example, the control switch 22, 26 may include a first push button valve 22 and a second push button valve 26. The hosing 15 may include a first output hose 30 running from the first push button valve 22 to a piston retraction input port 38 of the cylinder 34 and a second output hose 32 running from the second push button valve 26 to a piston extension input port 36 of the cylinder 34. Fluid entering the piston retraction input port 38 retracts the piston rod 40 into the cylinder 34 and fluid entering the piston extension input port 36 extends the piston rod 40 from the cylinder 34. A push plate 28 is coupled to the handlebar 52 so that when the handlebars 52 are turned in a first direction, the push plate 28 presses against and activates the first push button valve 22, and when the handlebars 52 are turned in a second direction, the push plate presses against 28 and activates the second push button valve 26.

The hosing 15 of the present invention fluidly connects the components together. The hosing 15 may further include a compressor hose 16 running from the air compressor 12 and coupled to a tee connector 18, a first valve feed hose 20 running from the tee connector 18 to the first push button valve 22, and a second valve feed hose 24 running from the tee connector 18 to the second push button valve 26.

In certain embodiments, a bracket 44 pivotably couples the distal end of the piston rod 40 to the fork tube. The bracket 44 may include an L-bracket having a horizontal portion and a vertical portion. The vertical portion may be bolted to an outer side of the fork tube. A ball may extend from an upper surface of the horizontal portion. The distal end of the piston rod 40 may include a ball socket. The ball of the horizontal portion is disposed within the ball socket forming a ball joint 42, thereby pivotably coupling the piston rod 40 to the fork tube.

The below example includes the L-bracket 44 coupled to a left fork tube of the fork 48. However, the present invention encompasses an embodiment including the L-bracket 44 coupled to a right for tube of the fork 48. When turned on by the power switch 10, the air compressor 12 sends fluid through the air pressure switch 14 which sends fluid through the compressor hose 16 to the tee connector 18. The tee connector 18 diverts the fluid to the first valve feed hose 20 and the second valve feed hose 24. The first valve feed hose 20 directs fluid to the first push button valve 22 and the second valve feed hose 24 directs fluid to the second push button valve 26. The first push button valve 22 and the second push button valve 26 are disposed on either side of the push plate 28 so that when turning the handlebars 52 left the push plate 28 opens the first push button valve 22 pulling the piston rod 40 inward and causing the power steering system to aid with the left turn. When turning the handlebars 52 to the right the push plate 28 opens the second push button valve 26 which activates the piston rod 40 to push outward causing the power steering system to aid with the right turn. When the handlebar 52 is facing straight forward, the push plate 28 does not engage the first push button valve 22 or the second push button valve 26 so that the first push button valve 22 and the second push button valve 26 are closed.

A method of assembling the present invention may include the following. The air compressor 12 and air pressure switch 14 are affixed to the motorcycle trike 50 toward the rear and can be attached to the side of a bolt on trike kit, inside a saddlebag or trunk, or anywhere there is room for it to be attached. Electrical wiring is run from battery 46 to the off and on toggle power switch 10. The electrical wiring is run from the power switch 10 to the air compressor 12 and air pressure switch 14. The air compressor 12 feeds fluid to an air pressure switch 14 which then feeds fluid to the first push button valve 22 and the second push button valve 26 located on each side of the handlebars 52. The first push button valve 22 and the second push button valve 26 are attached to handlebars 52 with brackets. The hose 15 is run from the first push button valve 22 and the second push button valve 26 to the cylinder 34 which is attached to the trike approximately one foot back from the fork 48, allowing room for the left and right turns. The piston rod 40 is also attached to the fork 48 by the L-bracket 44.

It should be understood, of course, that the foregoing relates to exemplary embodiments of the invention and that modifications may be made without departing from the spirit and scope of the invention as set forth in the following claims.

What is claimed is:

1. A power steering system comprising:
   a piston comprising a piston rod disposed within a cylinder, wherein a distal end of the piston rod is configured to be pivotably coupled to a fork tube of a motorcycle fork;
   a power source configured to drive the piston rod away from the cylinder and retract the piston rod within the cylinder; and
   a control switch configured to control the piston between a neutral position, a first turn position, and a second turn position, wherein
   the neutral position comprises the piston rod partially extended from the cylinder, the first turn position comprises the piston rod extending further from the cylinder than the neutral position, and a second turn position comprises the piston rod retracted further within the cylinder than the neutral position.

2. The power steering system of claim 1, wherein the power source comprises a motorcycle battery electrically connected with an air compressor, wherein hosing runs from the air compressor to the piston.

3. The power steering system of claim 2, further comprising a power switch configured to be coupled to a handlebar of a motorcycle and operable to switch power from the motorcycle battery to the air compressor.

4. The power steering system of claim 2, wherein the control switch comprises a first push button valve and a second push button valve.

5. The power steering system of claim 4, wherein the hosing comprises a first output hose running from the first push button valve to a piston retraction input port of the cylinder, and a second output hose running from the second push button valve to a piston extension input port.

6. The power steering system of claim 5, wherein the control switch further comprises a push plate configured to be coupled to a motorcycle and positioned so that when handlebars of the motorcycle are turned in a first direction, the push plate activates the first push button valve, and when the handlebars of the motorcycle are turned in a second direction, the push plate activates the second push button valve.

7. The power steering system of claim 6, wherein the hosing further comprises a compressor hose running from the air compressor and coupled to a tee connector, a first valve feed hose running from the tee connector to the first push button valve, and a second valve feed hose running from the tee connector to the second push button valve.

8. The power steering system of claim 1, further comprising a bracket pivotably coupled to the distal end of the piston rod and configured to be coupled to the fork tube.

9. The power steering system of claim 8, wherein the bracket is an L-bracket.

10. The power steering system of claim 9, wherein the bracket is pivotably coupled to the distal end of the piston rod by a ball joint.

* * * * *